United States Patent
Egawa et al.

[11] Patent Number: 6,065,910
[45] Date of Patent: *May 23, 2000

[54] GEAR SHAPER CUTTING METHOD AND APPARATUS

[75] Inventors: Tsuneo Egawa; Masakatsu Fujita; Hisashi Kubokawa; Akihide Kakutani; Yoshiharu Tonohara, all of Kyoto, Japan

[73] Assignee: Mitsubishi Heavy Industries, Ltd., Tokyo, Japan

[ * ] Notice: This patent is subject to a terminal disclaimer.

[21] Appl. No.: 09/110,850

[22] Filed: Jul. 7, 1998

[30] Foreign Application Priority Data

Jul. 7, 1997 [JP] Japan .................................. 9-180962

[51] Int. Cl.⁷ ........................................... B23F 17/00
[52] U.S. Cl. ............................... 409/26; 407/20; 409/12; 409/51; 428/698; 451/148
[58] Field of Search .................... 409/1, 11, 12, 409/13, 26, 51; 451/148; 407/23, 20, 26, 21, 119, 28, 29; 428/698

[56] References Cited

U.S. PATENT DOCUMENTS

| | | | |
|---|---|---|---|
| 4,594,294 | 6/1986 | Eichen et al. ............... | 428/698 X |
| 4,717,632 | 1/1988 | Keem et al. ................. | 428/698 |
| 5,030,038 | 7/1991 | Ariura .......................... | 407/26 |
| 5,586,848 | 12/1996 | Suwijn ......................... | 409/137 |
| 5,656,383 | 8/1997 | Tanaka et al. ............... | 428/698 |

FOREIGN PATENT DOCUMENTS

| | | | |
|---|---|---|---|
| 162656 | 11/1985 | European Pat. Off. ...... | 407/339 |
| 4221057 | 8/1992 | Japan . | |
| 453642B2 | 8/1992 | Japan . | |
| 567705B2 | 9/1993 | Japan . | |
| 406015504 | 1/1994 | Japan ........................... | 407/119 |
| 9104966 | 4/1997 | Japan . | |

OTHER PUBLICATIONS

Kase, Shin; Practical Machining Textbook, Daily Industrial Newspaper Co., Ltd., p. 145, lines 2 and 16.

Machining Technique Handbook, Reivsed and Enlarged Edition, edited by Machining Technique Handbook Editor's Committee: Daily Industrial Newspaper Co., Ltd. . . . , p. 431, lines 4–8 and p. 432, lines 8–11.

Newspaper article regarding winning of Minister of International Trade and Industry Award for Superior Energy–Saving Device, Feb. 5, 1999.

Newspaper article regarding winning of Nikkei Award for Excellent Product, Feb. 18, 1999.

Kitaura, Sei–ichiro and Torii, Nobuyoshi; Practice in Cutting of a Hard Material, Dec. 1994, p. 21.

Kusakabe, Yuji, Mizuta, Mitsuo, and Arai, Kunihiko; Cutting Performance of (Ti,Al)N Coated Gear Hobs, Kobe Steel Engineering Reports, vol. 41, No. 3 (1991), p. 43.

Yamada, Yasuyuki, Aoki, Taiitu, Tanaka, Yusuki, Hayasaki, Hiroshi and Motonishi, Suguru; High Speed Cutting Performance of (Al,Ti)N Coated Carbide Endmills, pp. 211–216.

*Primary Examiner*—William Briggs

[57] ABSTRACT

A gear shaper effects a gear shaper cutting method by dry cutting, using a pinion cutter made of high-speed tool steel at a high efficiency. The pinion cutter of the gear shaper is coated, at least on the flank thereof, with at least one layer of film having a composition comprising: $(Ti_{(1-x)} Al_x)(N_y C_{(1-y)})$, wherein $0.2 \leq x \leq 0.9$ and $0.2 \leq y \leq 1.0$. Gear shaper cutting is performed at a cutting speed of 300 m/min or less.

29 Claims, 11 Drawing Sheets

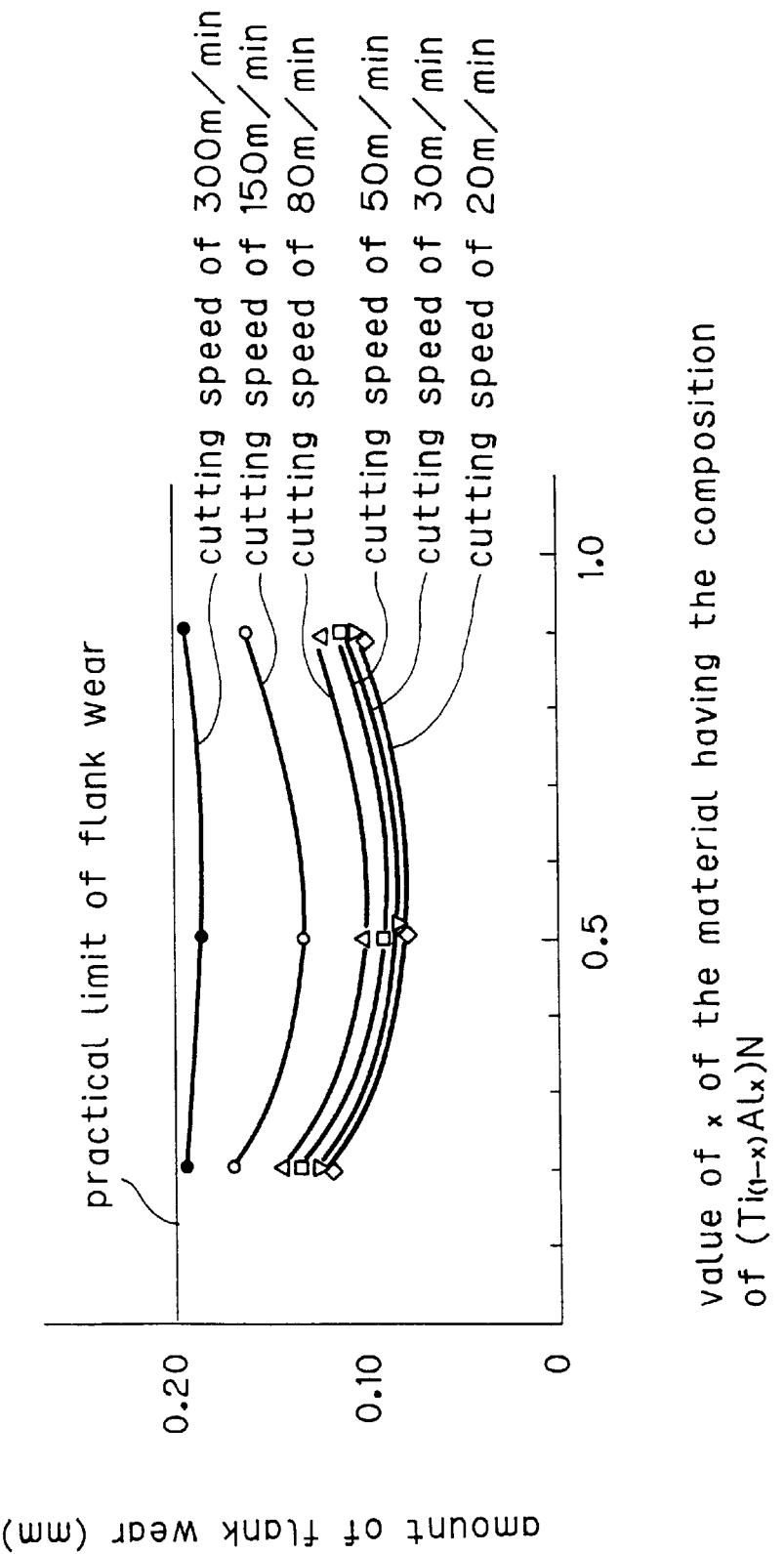

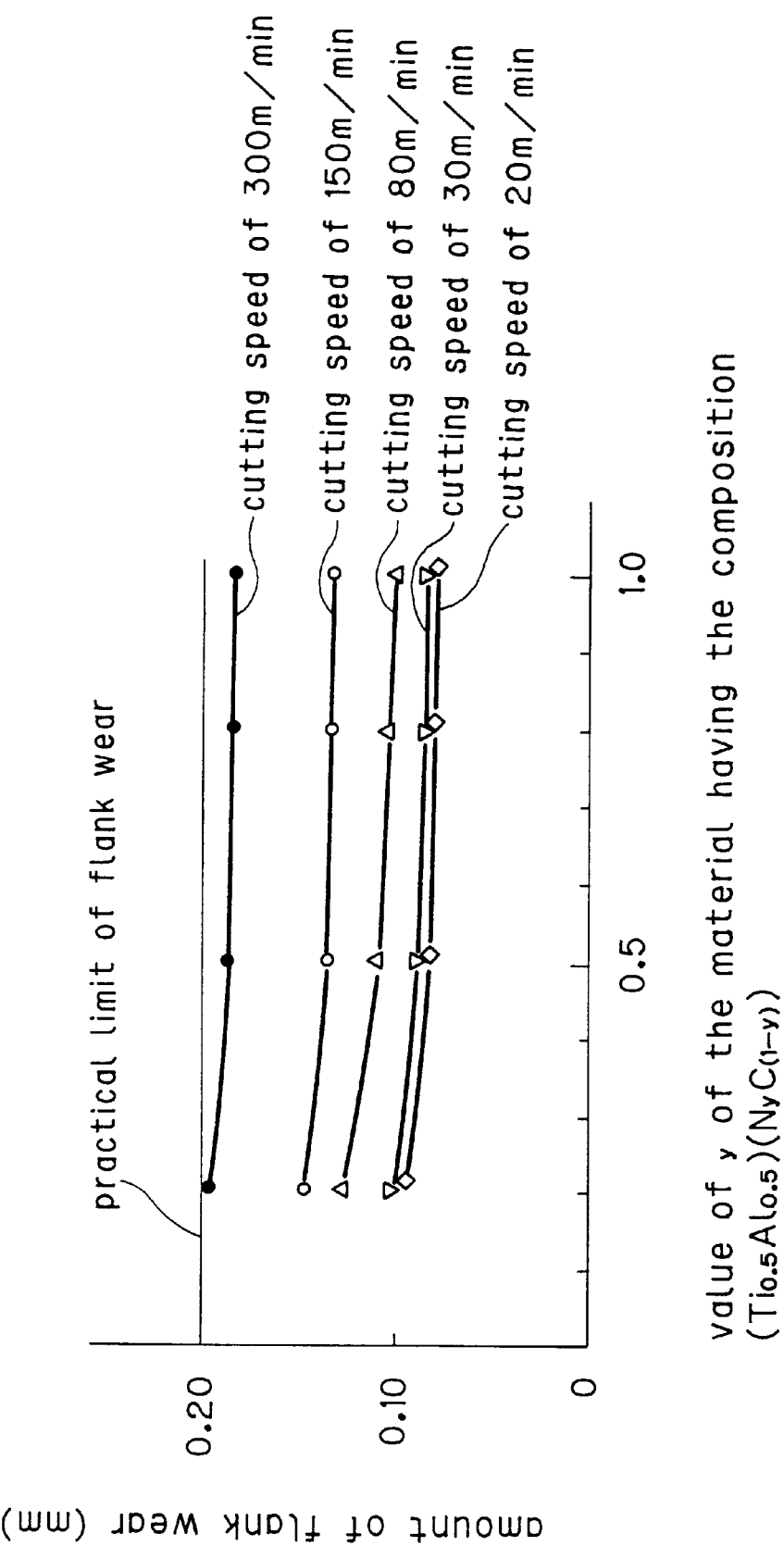

GEAR SHAPER CUTTING METHOD AND APPARATUS

BACKGROUND OF THE INVENTION

1. Field of the Invention

The present invention relates to a gear shaper cutting apparatus and method for gear shape cutting with use of gear shaping tools such as a pinion cutter and a rack cutter having a cutting edge portion made of high-speed tool steel.

2. Description of Related Art

FIG. 11 shows a conventional gear shaper apparatus and cutting method (gear shaping method). A work 1 is loaded into a work fixture 3 on a table 2 of a gear shaping machine (hereinafter, referred to as gear shaper). A pinion cutter 4, which is a gear shaping tool, is mounted to a cutter head 5 of the gear shaper. The pinion cutter 4 is made of high-speed tool steel. Cutting (generation) of teeth onto the work 1 is performed by vertically reciprocating the pinion cutter 4 to allow it to cut into the work 1, and further imparting relative rotations to the pinion cutter 4 and the work 1. The teeth are successively formed on the outer peripheral surface of the work 1. The machining conditions are determined so that predetermined teeth are generated on the outer periphery of the work 1. During the machining operation, cutting oil 6 is sprayed onto a cutting portion through a nozzle 7 to lubricate and cool the cutting portion.

Such a conventional gear shaper apparatus and cutting method as mentioned above has had a problem that the gear cutting speed is low, which increases the machining cost. The gear cutting speed is substantially determined by the speed (hereinafter, referred to as cutting speed) of the pinion cutter 4 when vertically moving, which is usually 40 m/min for rough cutting and about 70 m/min for finish cutting.

Also, since cutting oil is sprayed, the working environment worsens, and waste liquor disposal of the cutting oil is required. This has led to a problem wherein cost is also increased for the disposal.

Recently, a high-speed gear shaping cutting technique using a gear shaping tool made of cemented carbide has been developed. Thus, the generation of teeth by a gear shaper has become more efficient. In the case of using a gear shaping tool made of cemented carbide, a heat crack will develop if machining is performed under the supply of cutting oil, because cemented carbide is fragile. For this reason, in the case of using a gear shaping tool made of cemented carbide, a dry cutting method in which machining is performed without the supply of cutting oil is mainly adopted. Since cemented carbide is much higher in both heat resistance and wear resistance than the high-speed tool steel, no problem occurs even if such dry cutting is performed.

As mentioned above, the machining efficiency is improved by using a gear shaping tool made of cemented carbide and it may become possible to reduce the machining cost by the increased cutting speed. However, the gear shaping tool made of cemented carbide is so expensive that the total cost becomes extremely high even if the machining efficiency is improved. In addition, since cemented carbide is fragile, there is a fear that a sudden crack may occur. For this reason, the gear shaping tool of cemented carbide is not presently in wide practical use.

SUMMARY OF THE INVENTION

The present invention has been accomplished in view of the above-mentioned circumstances and it is an object of the invention to provide a gear cutting apparatus and method using a gear shaper capable of greatly improving the cutting speed, without using a gear shaping tool made of cemented carbide.

According to the present invention, for achieving the above-mentioned object, there is provided a gear shaper apparatus for performing a cutting method for teeth generation with use of a gear shaping tool made of high-speed tool steel. The apparatus includes a gear shaping tool, coated at least on the flank thereof, with at least one layer of film of composition comprising:

$$(Ti_{(1-x)}Al_x)(N_yC_{(1-y)}),$$

where,
$0.2 \leq x \leq 0.9$ and
$0.2 \leq y \leq 1.0$.

In the method, teeth are generated by dry cutting at a cutting speed of 300 m/min or less, while air is preferably blown against a cutting portion without using cutting oil.

Also, in a further preferred embodiment, teeth are generated using a gear shaping tool coated with at least one layer of film of composition comprising:

$$(Ti_{(1-x)}Al_x) N$$

$0.2 \leq x \leq 0.9$.

In an even further preferred embodiment, teeth are generated using a gear shaping tool coated with at least one layer of film of composition comprising:

$$(Ti_{0.5}Al_{0.5})(N_yC_{(1-y)})$$

$0.2 \leq y \leq 1.0$.

In yet a further preferred embodiment, teeth are generated using a gear shaping tool coated with at least one layer of film of composition comprising:

$$(Ti_{0.5}Al_{0.5})N,$$

and teeth are generated using a gear shaping tool having a total film thickness of 0.5 to 10 μm by five- or ten-layer coating with a 0.05 μm thick TiN film sandwiched between films having the composition comprising $(Ti_{0.5} Al_{0.5})N$.

In still a further preferred embodiment, teeth are generated using a gear shaping tool having a film thickness of 0.5 to 10 μm.

In still an even further preferred embodiment, teeth are generated using a gear shaping tool having a film thickness of 1.7 μm.

In another preferred embodiment, teeth are generated by blowing air against a cutting portion.

Also, according to another aspect of the present invention a gear shaper for teeth generation with use of a gear shaping tool made of high-speed tool steel is provided, wherein the gear shaping tool is coated at least on the flank thereof with at least one layer of film having composition comprising $$(Ti_{(1-x)} Al_x)(N_yC_{(1-y)})$$

where $0.2 \leq x \leq 0.9$ and $0.2 \leq y \leq 1.0$, and wherein the teeth are generated by dry cutting at a cutting speed of 300 m/min or less.

The gear shaper is further characterized in that teeth are generated using a gear shaping tool coated with at least one layer of film having composition comprising $(Ti_{(1-x)}Al_x)N$, where, $0.2 \leq x \leq 0.9$.

The gear shaper is also further characterized in that teeth are generated using a gear shaping tool coated with at least one layer of film having composition comprising $$(Ti_{0.5}Al_{0.5})(N_yC_{(1-y)})$$

where $0.2 \leq y \leq 1.0$.

The gear shaper is also further characterized in that teeth are generated using a gear shaping tool coated with at least one layer of film having composition comprising $(Ti_{0.5}Al_{0.5})N$.

The gear shaper is also further characterized in that teeth are generated using a gear shaping tool coated with the film having a thickness of 0.5 to 10 μm.

The gear shaper is also further characterized in that teeth are generated using a gear shaping tool coated with the film having a thickness of 1.7 μm.

The gear shaper is also further characterized in that teeth are generated using a gear shaping tool having a total film thickness of 0.5 to 10 μm by five- or ten-layer coating with a 0.05 μm thick TiN film sandwiched between films having the composition comprising $(Ti_{0.5} Al_{0.5})N$.

Finally, the gear shaper is also characterized in that air is blown against a cutting portion for teeth generation.

These and other objects of the present application will become more readily apparent from the detailed description given hereinafter, which gives specific examples of preferred embodiments by illustration only.

BRIEF DESCRIPTION OF THE DRAWINGS

Other features and advantages of the invention will be apparent from the following description taken in connection with the accompanying drawings, wherein:

FIG. 3 is a graph showing relationship between the value of x in a coating of $(Ti_{(1-x)}Al_x)N$ on the pinion cutter and the amount of flank wear thereof;

FIG. 4 is a graph showing the relationship between the value of y in a coating of $(Ti_{0.5}Al_{0.5})N(N_yC_{(1-y)})$ on the pinion cutter and the amount of flank wear thereof;

DETAILED DESCRIPTION OF THE PREFERRED EMBODIMENTS

Figure 1:
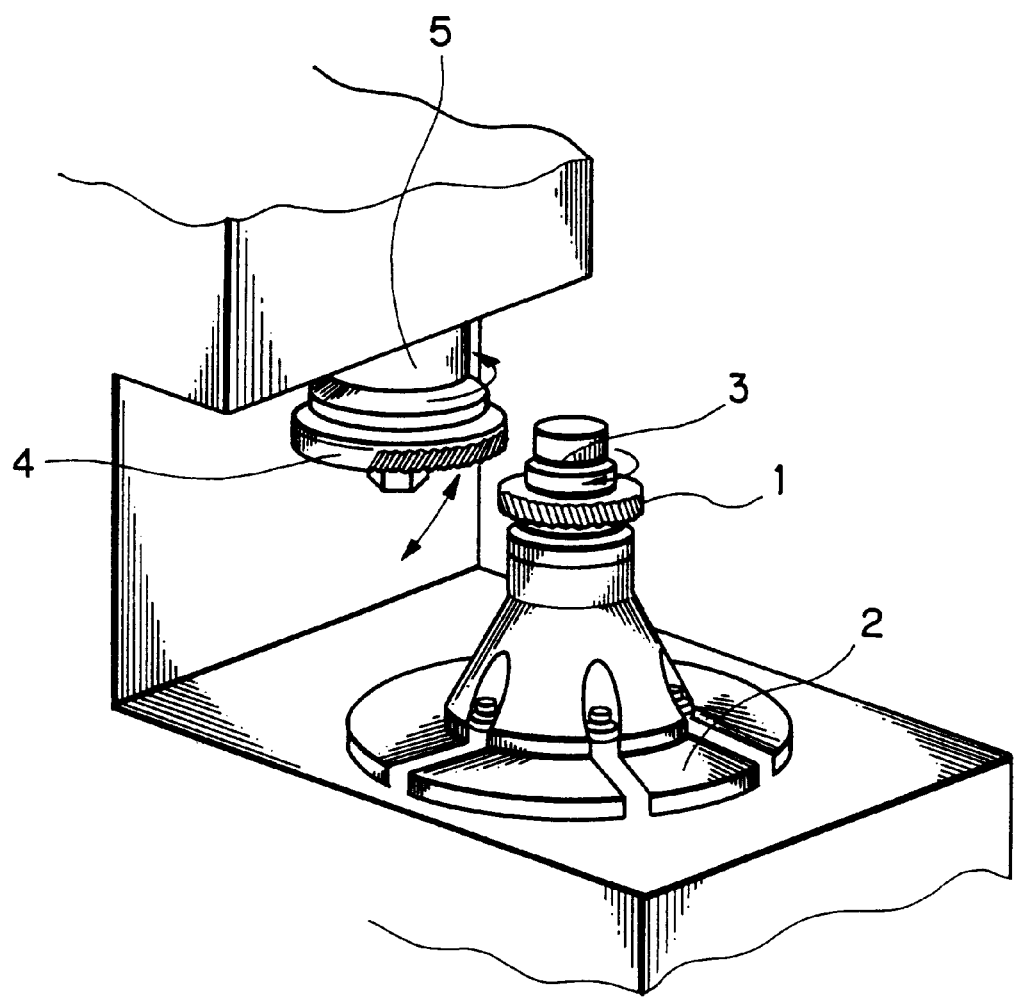
FIG. 1 is a schematic construction diagram of a cutting portion of a gear shaper which is employable for carrying out the gear shaping cutting method of the present invention.

The construction of a gear shaper employable for carrying out the gear shaper cutting method according to the present invention will be described below with reference to FIG. 1. FIG. 1 schematically illustrates a cutting portion of the gear shaper.

Figure 11:
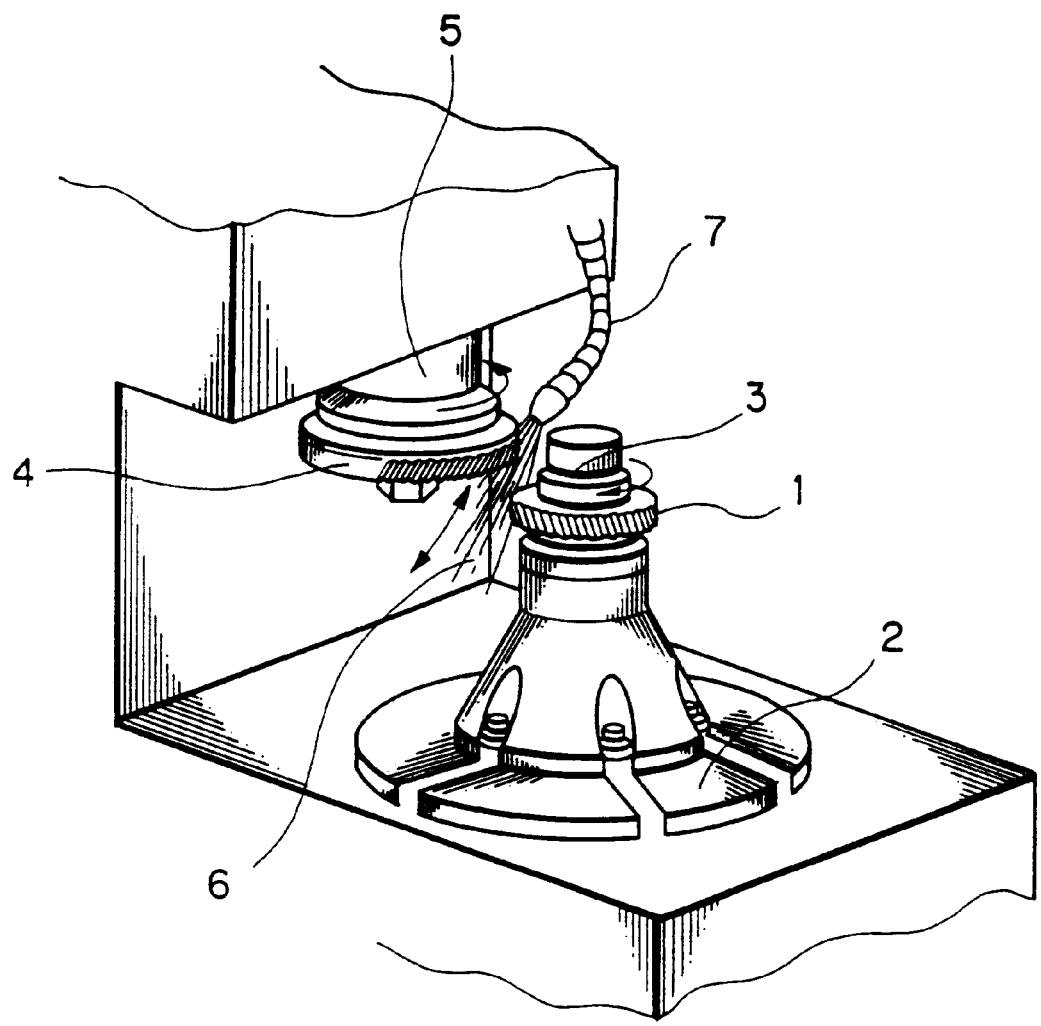
FIG. 11 is a schematic diagram showing a conventional gear shaping cutting method.

In FIG. 1, the construction of the gear shaper itself is substantially the same as the conventional one. Namely, a work 1 is loaded into a work fixture 3 on a table 2 of the gear shaper. On the other hand, a pinion cutter 4, which is a gear shaping tool, is mounted to a cutter head 5 of the gear shaper and is different from the known cutters as will be explained later. The table 2 and the cutter head 5 are adapted to be relatively rotated by a driving mechanism (not shown). Also, the cutter head 5 is vertically reciprocated, and further, the cutter head 5 and the table 2 are relatively moved to cut into the work. The basic construction is thus the same as shown in FIG. 11. However, a nozzle for supplying cutting oil is not included because dry cutting is carried out.

Figure 2A:
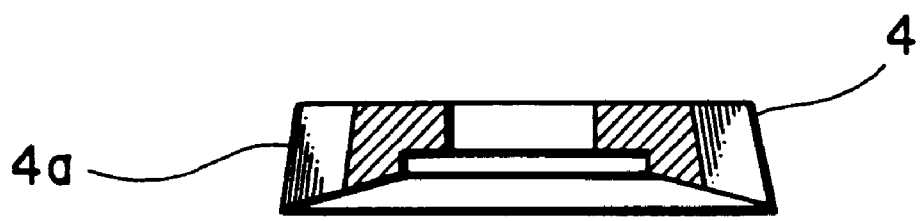
FIG. 2A and 2B are an explanatory views for illustrating a pinion cutter.
Figure 2B:
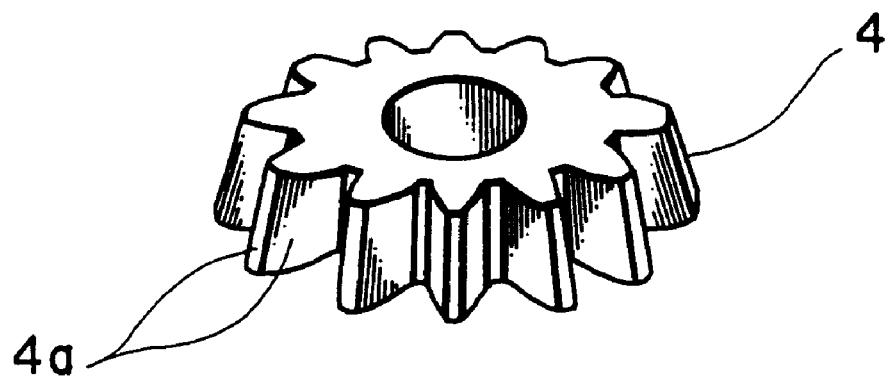

As the pinion cutter 4, pinion cutters made of high-speed tool steel coated with various films such as TiN, TiCN and TiAlN are known. In the gear shaper apparatus and cutting method according to the present invention, however, a pinion cutter coated with nitride of TiAl or carbonitride of TiAl is used. First as a first embodiment, there are taken as examples a pinion cutter coated with either TiAl nitride or TiAl carbonitride in a single layer and a pinion cutter coated with any of the materials, even in a single layer of multilayer coating. More specifically, there is used a pinion cutter coated at least on the flank 4a (See FIGS. 2A and B) of the pinion cutter 4 with at least a single layer of film having composition $(0.2 \leq x \leq 0.9$ and $0.2 \leq y \leq 1.0)$ comprising $(Ti_{(1-x)} Al_x) (N_yC_{(1-y)})$.

In the gear shaper shown in FIG. 1, the generation of teeth is, as in the conventional case, performed by vertically reciprocating the pinion cutter 4 to allow it to cut into the work 1, and further imparting relative rotations to the pinion cutter 4 and the work 1. The teeth are successively formed on the outer peripheral surface of the work 1. The machining conditions are determined so that predetermined teeth are generated on the outer periphery of the work 1. The cutting is performed by dry cutting without the supply of cutting oil.

The gear shaping cutting method is divided into two: rough cutting and finish cutting for machining. Further, since about 90% of the cut area is usually shaved by rough cutting, the load to be applied onto the pinion cutter 4 on finish cutting to be made next to the rough cutting is only a little. Therefore, wear on the pinion cutter 4 mainly occurs during rough cutting, and it is a point for improving the efficiency regarding how this wear should be restrained.

Taking notice of the cutting speed during rough cutting, FIG. 3 shows the relationship between the value of x of the material having the composition of $(Ti_{(1-x)}Al_x)N$ and flank wear, in which the value of x of the material having the composition of $(Ti_{(1-x)}Al_x)N$ coated on the pinion cutter 4 is taken in the axis of abscissa and the amount of flank wear (mm) of the pinion cutter 4 is taken in the axis of ordinate. The work is made of SCM435 (Japanese Industrial Standards: JIS Cr-Mo steel), and a gear to be machined possesses the following characteristics: module 2.5, a number of teeth 40, face width 20 mm and an angle of torsion 20°. The pinion cutter 4 has a base metal of SKH51 (JIS high-speed tool steel), a number of teeth 50, an outside diameter 130 mm and a single layer of coating with a film thickness of 1.7 $\mu$m. The machining conditions other than cutting speed are as follows: circumferential feed 3 mm/stroke and radial feed 7 $\mu$m/stroke. In this respect, the conditions for finish cutting following rough cutting are as follows: a cutting speed 100 m/min, circumferential feed 1mm/stroke and radial feed 3 $\mu$m/stroke.

In FIG. 3, the amount of flank wear of the pinion cutter designates an amount of flank wear after 100 works are shaped at each of various cutting speeds (20, 30, 50, 80, 150 and 300 m/min) respectively. As the cutting speed increases, the amount of wear increases. However, it still falls under an amount of flank wear of a practical level even at a cutting speed of 300 m/min. This amount of flank wear of a practical level means that the amount of flank wear after 100 works are shaved under the above-mentioned conditions is 0.2 mm or less. In this respect, when shaving is made with a pinion cutter coated with conventionally general TiCN by wet cutting in which cutting oil is used under the above-mentioned conditions, the amount of flank wear reaches 0.2 mm at a cutting speed of 50 m/min.

Accordingly, it can be seen that the machining can be performed at a cutting speed six times the conventional one without using cutting oil, if a pinion cutter 4 having the coating shown in FIG. 3 is used. In this case, the value of x in the coating film is $0.2 \leq x \leq 0.9$.

When the cutting speed decreases, the amount of flank wear decreases. However, the flank wear is hardly changed even if the cutting speed decreases at a cutting speed of 30 m/min or less. Therefore, the cutting speed is preferably 30 m/min or more in view of the machining efficiency.

In this respect, the life of the pinion cutter is determined by flank wear or crater wear, whichever is greater. Further, in the case of the present invention, the crater wear becomes ¼ or less of the flank wear, and the life of the pinion cutter is completely determined by the flank wear.

The reason why the flank wear is minimum at x=0.5 in FIG. 3 is presumed to be because it is a minimum value at x=0.5 at which the hardness and oxidation resistance of the film are made compatible since the film softens when x becomes large and conversely, the oxidation resistance is deteriorated when x becomes small.

As a second embodiment, there is taken as an example a pinion cutter coated with $(Ti_{0.5}Al_{0.5}) (N_y C_{(1-y)})$ in a single layer, or a pinion cutter coated with $(Ti_{0.5}Al_{0.5}) (N_y C_{(1-y)})$ at least in a layer of multi-layer coating. Gear shaper cutting using this pinion cutter is performed without spraying cutting oil, namely by dry cutting as in the above-mentioned case. The conditions other than the coating of the pinion cutter 4 are the same as in the first embodiment.

The effect of the second embodiment is shown in FIG. 4.

As shown in FIG. 4, when the amount of flank wear is below the practical limit of an amount of wear at the cutting speed of 300 m/min, the composition of the coating film is $0.2 \leq y \leq 1.0$. At the cutting speed of 300 m/min or less, the lower the cutting speed, the less the flank wear. At the cutting speed of 30 m/min or less, however, the flank wear is hardly changed. Therefore, the cutting speed is preferably 30 m/min or more in view of the machining efficiency. The reason why the wear resistance is deteriorated as the value of y becomes smaller is presumed to be because the oxidation resistance is deteriorated as a result of an increase of C instead of N.

Figure 5:
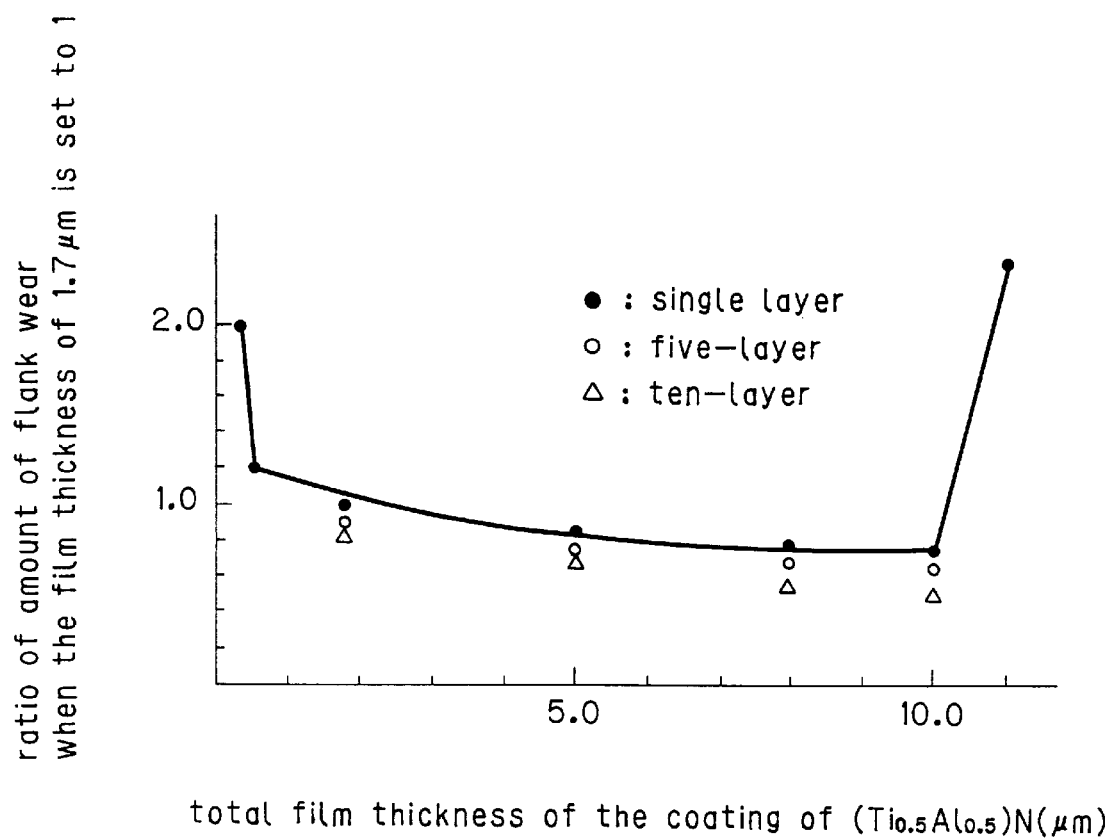
FIG. 5 is a graph showing the relationship between film thickness of the coating and flank wear.

FIG. 5 is a graph for determining an appropriate thickness of the coating of $(Ti_{0.5}Al_{0.5})N$, in which the axis of abscissa represents the total of film thicknesses. In the same figure, if the $(Ti_{0.5}Al_{0.5})N$ coating is a single layer, the thickness thereof is represented. In the case of a multi-layer coating, the total of all the film thicknesses is represented. The axis of ordinate represents the ratio of flank wear, assuming that the flank wear of the pinion cutter 4 having a single layer of 1.7 $\mu$m thick $(Ti_{0.5}Al_{0.5})N$ coating is 1.

The relationship between flank wear and film thickness in the case of a single layer $(Ti_{0.5}Al_{0.5})N$ coating shows that at the film thickness of 0.5 $\mu$m the flank wear is about 20% greater than that at the film thickness of 1.7 $\mu$m and that the flank wear diminishes gradually as the film thickness increases. At the film thickness of 10 $\mu$m the flank wear is 20% less than that at the film thickness of 1.7 $\mu$m. However, at the film thickness as small as 0.3 $\mu$m, the flank wear increases to twice the flank wear at the film thickness of 1.7 $\mu$m. On the other hand, at the film thickness of 11 $\mu$m, film separation occurs and the wear increases rapidly.

In the case of a multi-layer coating of $(Ti_{0.5}Al_{0.5})N$, for example, in the case of a five- or ten-layer coating with 0.05 $\mu$m thick TiN layer sandwiched between $(Ti_{0.5}Al_{0.5})N$ layers, a slightly higher performance than in the case of a single layer as shown in FIG. 5 is attained. From the foregoing, it can be seen that the film thickness is preferable in the range of 0.5 $\mu$m to 100 $\mu$m, and that it is optional as to whether the coating is of a single layer or of plural layers.

Figure 6:
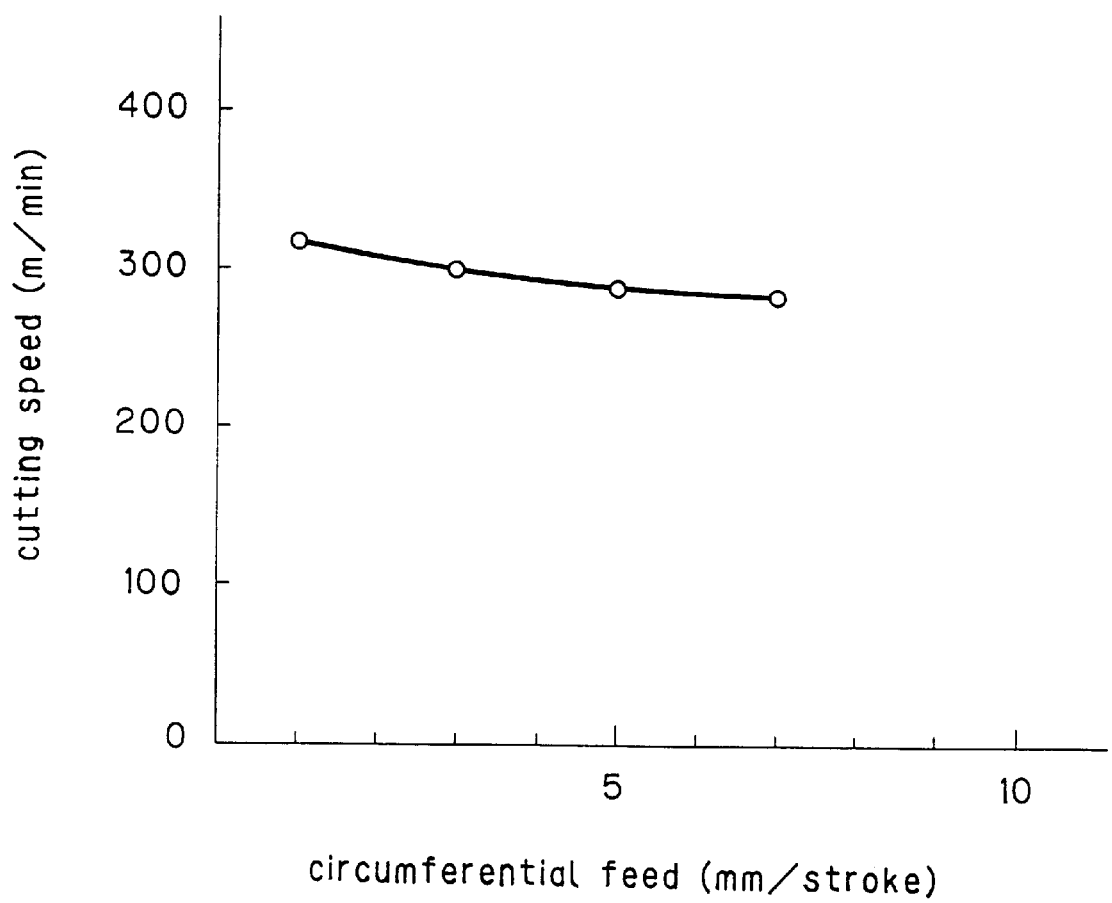
FIG. 6 is a graph showing the relationship between circumferential feed and cutting speed in a cutting method according to the present invention.

FIG. 6 shows the result obtained by investigating the effect of circumferential feed of the cutting conditions under the same equipment conditions as in the first embodiment. The cutting speeds which exceed the practical limit of wear are shown for each circumferential feed.

As cutting conditions for the gear shaper cutting method, there are circumferential feed and radial feed in addition to the cutting speed. Of these, the cutting speed exerts the greatest influence on tool wear, and next comes the circumferential feed. However, the degree of influence of the circumferential feed is generally considerably smaller than that of the cutting speed.

As shown in FIG. 6, at circumferential feed of 1 mm/stroke, the practical wear limit is exceeded when the cutting speed exceeds 320 m/min. From this figure, it can be seen that the cutting speed for falling below the practical wear limit is not much affected by the circumferential feed, but is substantially 300 m/min within a wide circumferential feed range. In this respect, the pinion cutter 4 used here is coated with $(Ti_{0.5} Al_{0.5})N$. The other conditions are the same as in the first embodiment except for the circumferential feed.

Figure 7:
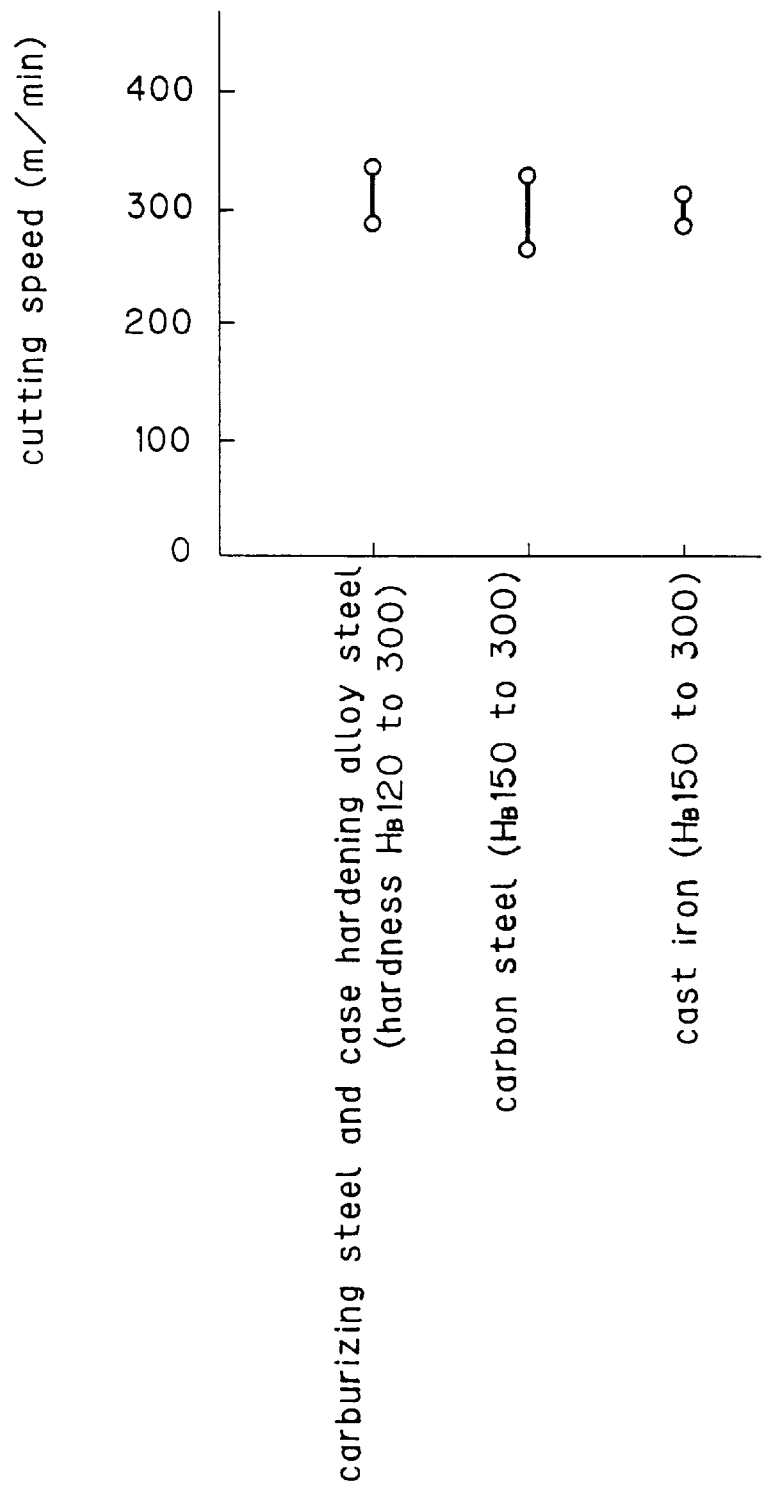
FIG. 7 is a graph showing the relationship between the material of the work and the cutting speed in the cutting method according to the present invention.

FIG. 7 shows the cutting speeds which exceed the practical wear limit for each material of the work 1. As the material for the work, there were used carburizing steel and case hardening alloy steel (hardness $H_B$ 120 to 300), carbon steel (hardness $H_B$ 150 to 300) and cast iron (hardness $H_B$ 150 to 300). In FIG. 7, there are cutting speeds exceeding the practical limit within a range enclosed with marks ○ in each work material. Accordingly, even if the work material is changed, it does not exceed the practical wear limit, but can be practically used so long as the cutting speed is substantially below 300 m/min. In this respect, as the conditions here, the coating is performed with $(Ti_{0.5} Al_{0.5})N$. The other conditions are the same as in the first embodiment, except for the work material.

Figure 8:
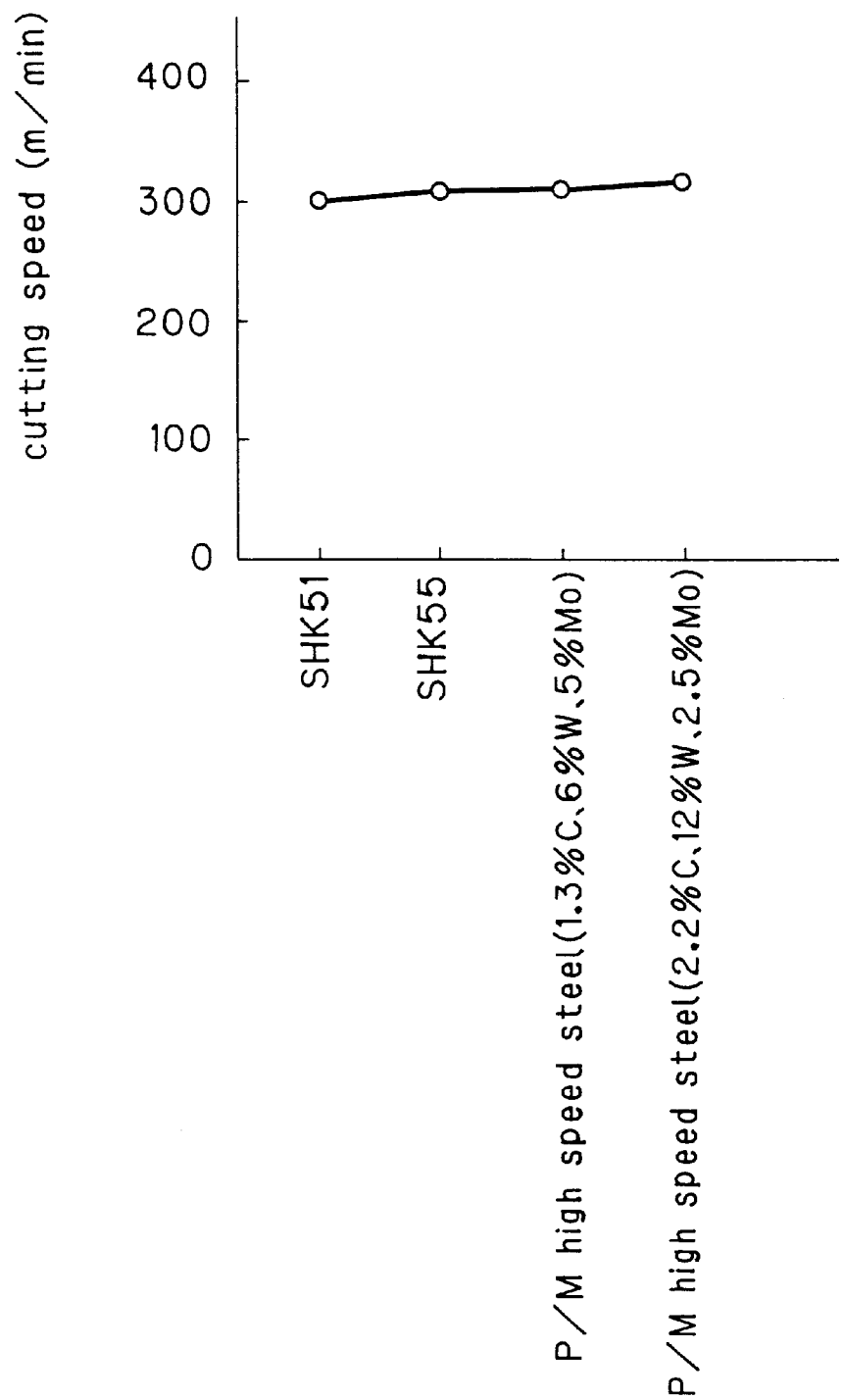
FIG. 8 is a graph showing the relationship between the material of the base metal of the pinion cutter and the cutting speed in the cutting method according to the present invention.

FIG. 8 shows cutting speeds which exceed the practical wear limit for each base metal of various pinion cutters. As the base metal, pinion cutters using SKH51, SKH55, P/M high speed steel (1.3% C-6% W-5% Mo) or P/M high speed steel (2.2% C-12% W-2.5% Mo) are listed. As can be seen from the figure, the pinion cutter is below the practical wear limit and can be practically used if the cutting speed is substantially 300 m/min or less even if its base metal is changed. In this respect, as the conditions here, the coating is performed with $(Ti_{0.5}Al_{0.5})N$, and the other conditions are the same as in the first embodiment, except for the base material of the pinion cutter.

Figure 9:
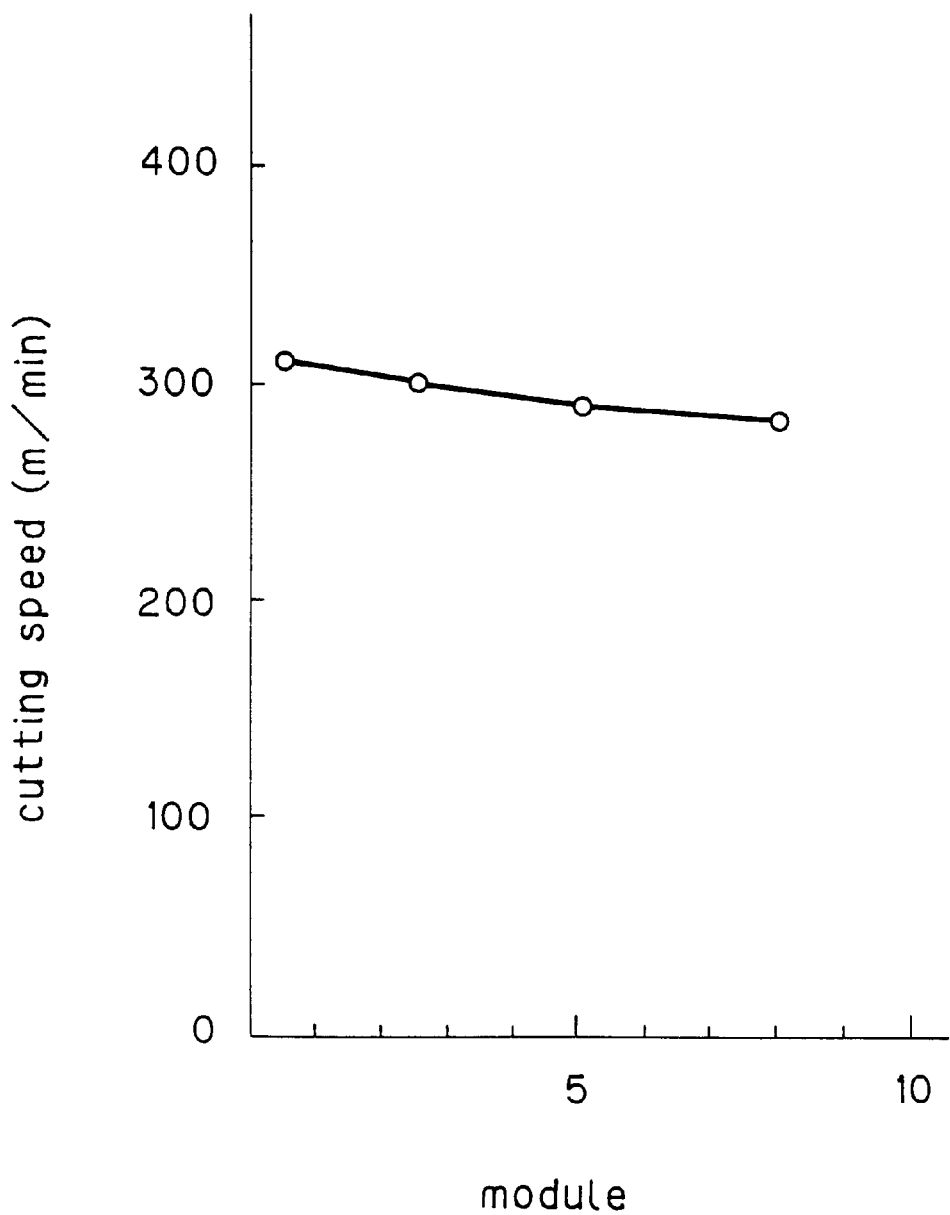
FIG. 9 is a graph showing the relationship between the work module and the cutting speed in the cutting method according to the present invention.

FIG. 9 shows the relationship between work module and cutting speeds exceeding the practical wear limit. From this figure, it can be seen that the pinion cutter falls below the practical wear limit and can be practically used if the cutting speed is substantially 300 m/min or less. The conditions here are the same as in the first embodiment, except for the diameter of the pinion cutter and the work module. The diameter of the pinion cutter is (work module/2.5)×130 mm, and the coating is performed with $(Ti_{0.5}Al_{0.5})N$.

Figure 10:
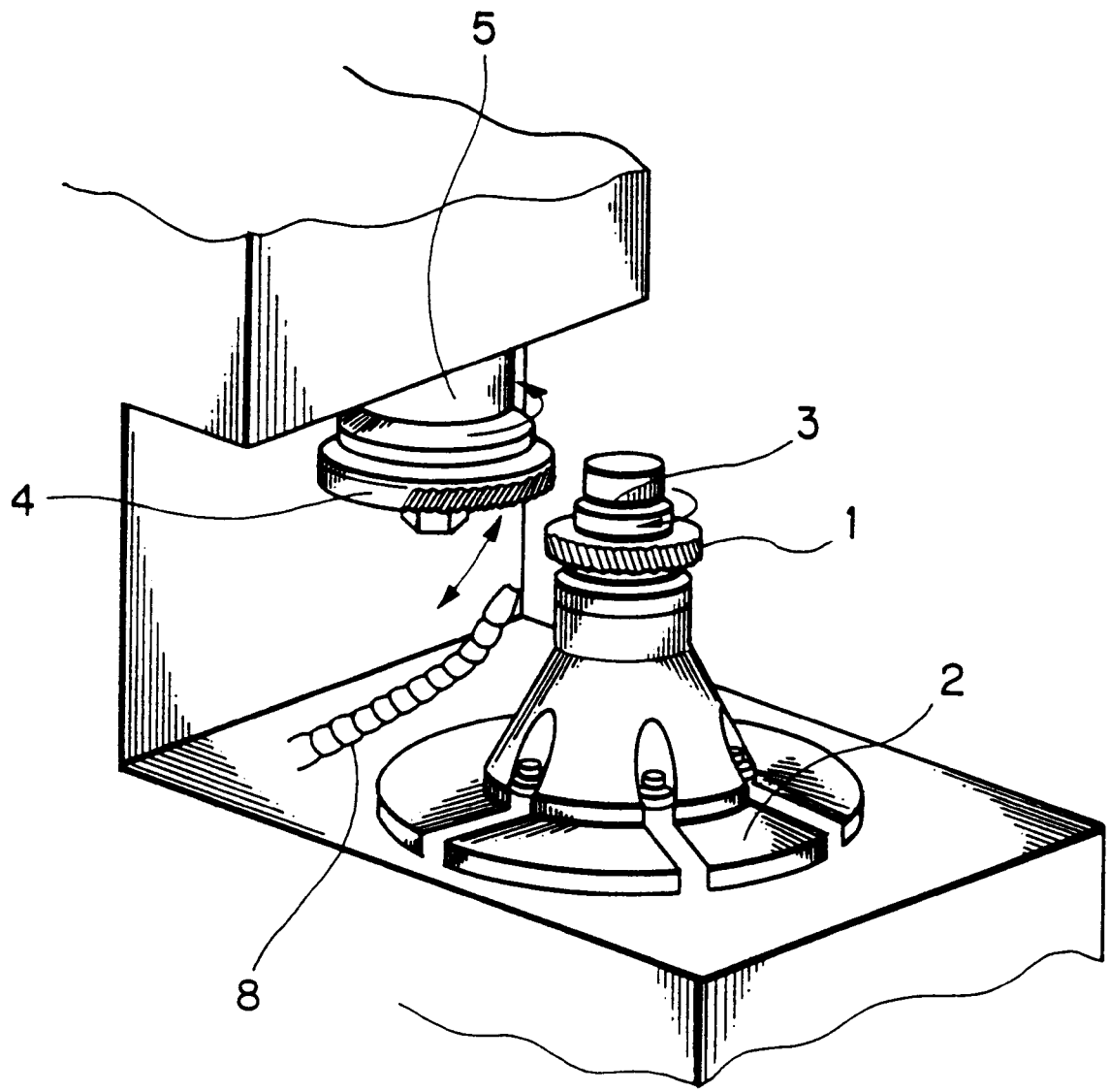
FIG. 10 is a schematic construction diagram of a cutting portion of a gear shaper which is employable for carrying out the gear shaper cutting method according to the present invention.

FIG. 10 shows partial construction of a gear shaper employable for carrying out another embodiment of the present invention. This gear shaper is obtained by adding an air nozzle 8 for blowing air against a cutting portion to the gear shaper shown in FIG. 1, and the other construction is the same as shown in FIG. 1.

According to a conventional method of spraying cutting oil, generated shavings are washed down with cutting oil so that they are not included between work and pinion cutter at the cutting portion. However, if no cutting oil is sprayed, such an inclusion may occur to damage the work. If air is supplied to the cutting portion during a dry cutting operation as in this embodiment, the generated shavings at the cutting portion will be blown off and removed to prevent the shavings from being included. In this respect, if a small amount of cutting oil is mixed into air to blow the mixture as mist against the cutting portion, substantially the same effect as in the case of dry cutting can be obtained.

In the above-mentioned embodiment, the pinion cutter was exemplified as the gear shaping tool, but the embodiment is likewise applicable to a rack cutter.

According to a gear shaper cutting method according to a first embodiment, there is provided a gear shaper cutting method for teeth generation with the use of a gear shaping tool made of high-speed tool steel, wherein the gear shaping tool is coated at least on the flank thereof with at least one layer of film of the composition comprising:

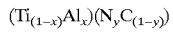

where $0.2 \leq x \leq 0.9$
$0.2 \leq y \leq 1.0$ wherein it is possible to greatly increase the cutting speed for teeth generation without using any expensive tool, such as a tool made of cemented carbide. This is because it has been arranged to machine at a cutting speed of 300 m/min or less without using cutting oil. As a result, it becomes possible to effect gear cutting of a high efficiency at a low cost. In addition, since the dry cutting method is adopted, the supply of cutting oil, which was required in the conventional machining using a tool made of high-speed tool steel, becomes unnecessary. Thus, the cost can be reduced, and the working environment can be improved.

Also, according to a gear shaper cutting method of a second invention, since it has been arranged to blow air against a cutting portion for teeth generation, it becomes possible to realize teeth generation of a high efficiency at a low cost, without causing the inclusion of shavings.

The invention being thus described, it will be obvious that the same may be varied in many ways. Such variations are not to be regarded as a departure from the spirit and scope of the invention, and all of the modifications as would be obvious to one skilled in the art are intended to be included within the scope of the following claims.

What is claimed is:

1. A gear shaper cutting method comprising the steps of: generating teeth using a gear shaping tool made of high-speed tool steel, the gear shaping tool is coated, at least on a flank thereof, with at least one layer of film having composition comprising

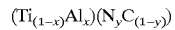

wherein $0.2 \leq x \leq 0.9$ and $0.2 \leq y \leq 1.0$, and wherein the teeth are generated by dry cutting at a cutting speed of 300 m/min or less.

2. A gear shaper cutting method as defined in claim 1, wherein the teeth are generated using the gear shaping tool coated with at least one layer of film having composition comprising $(Ti_{(1-x)}Al_x)N$, wherein $0.2 \leq x \leq 0.9$.

3. A gear shaper cutting method as defined in claim 1, wherein teeth are generated using said gear shaping tool coated with at least one layer of film having composition comprising $(Ti_{0.5}Al_{0.5})(N_yC_{(1-y)})$, wherein $0.2 \leq y \leq 1.0$.

4. A gear shaper cutting method as defined in claim 1, wherein the teeth are generated using the gear shaping tool coated with at least one layer of film having composition comprising $(Ti_{0.5}Al_{0.5})N$.

5. A gear shaper cutting method as defined in claim 1, wherein the teeth are generated using the gear shaping tool having a film thickness of 0.5 to 10 μm.

6. A gear shaper cutting method as defined in claim 5, wherein the teeth are generated using the gear shaping tool having a film thickness of 1.7 μm.

7. A gear shaper cutting method as defined in claim 4, wherein the teeth are generated using the gear shaping tool having a total film thickness of 0.5 to 10 μm, by five- or ten-layer coating with a 0.05 μm thick TiN film sandwiched between films having the composition comprising $(Ti_{0.5}Al_{0.5})N$.

8. A gear shaper cutting method as defined in claim 1, further comprising the step of:

blowing air against a cutting portion.

9. A gear shaper cutting method as defined in claim 1, further comprising the step of:

blowing air against a cutting portion, without using cutting oil.

10. A gear shaper cutting method as defined in claim 2, wherein the teeth are generated using said gear shaping tool having a film thickness of 0.5 μm to 10 μm.

11. A gear shaper cutting method as defined in claim 10, wherein said machining is performed using said gear shaping tool having a film thickness of 1.7 μm.

12. A gear shaper cutting method as defined in claim 3, wherein the teeth are generated using said gear shaping tool having a film thickness of 0.5 μm to 10 μm.

13. A gear shaper cutting method as defined in claim 12, wherein the teeth generation is performed using said gear shaping tool having a film thickness of 1.7 μm.

14. A gear shaper cutting method as defined in claim 4, wherein the teeth are generated using said gear shaping tool having a film thickness of 0.5 μm to 10 μm.

15. A gear shaper cutting method as defined in claim 14, wherein the teeth generation is performed using said gear shaping tool having a film thickness of 1.7 μm.

16. A gear shaper cutting method as defined in claim 2, further comprising the step of:

blowing air against a cutting portion.

17. A gear shaper cutting method as defined in claim 3, further comprising the step of:

blowing air against a cutting portion.

18. A gear shaper cutting method as defined in claim 4, further comprising the step of:

blowing air against a cutting portion.

19. A gear shaper cutting method as defined in claim 5, further comprising the step of:

blowing air against a cutting portion.

20. A gear shaper cutting method as defined in claim 6, further comprising the step of:

blowing air against a cutting portion.

21. A gear shaper cutting method as defined in claim 7, further comprising the step of:

blowing air against a cutting portion.

22. A gear shaper cutting apparatus, comprising:

a gear shaping tool made of high-speed tool steel, said gear shaping tool being coated, at least on a flank thereof, with at least one layer of film having a composition comprising $(Ti_{(1-x)}Al_x)(N_yC_{(1-y)})$ wherein $0.2 \leq x < 0.9$ and $0.2 \leq y \leq 1.0$; and driving means for driving at least one of said gear shaping tool and a work, relative to the other, so as to generate teeth at a cutting speed of 300 m/min or less by dry cutting.

23. A gear shaper cutting apparatus as defined in claim 22, wherein said gear shaping tool is coated with at least one layer of film having a composition comprising $(Ti_{(1-x)}Al_x)N$, wherein $0.2 \leq x \leq 0.9$.

24. A gear shaper cutting apparatus as defined in claim 22, wherein said gear shaping tool is coated with at least one layer of film having a composition comprising $(Ti_{0.5}Al_{0.5})(N_yC_{(1-y)})$ wherein $0.2 \leq y \leq 1.0$.

25. A gear shaper cutting apparatus as defined in claim 22, wherein said gear shaping tool is coated with at least one layer of film having a composition comprising $(Ti_{0.5}Al_{0.5})N$.

26. A gear shaper cutting apparatus as defined in claim 22, wherein said gear shaping tool has a film thickness of 0.5 to 10 μm.

27. A gear shaper cutting apparatus as defined in claim 26, wherein said gear shaping tool has a film thickness of 1.7 μm.

28. A gear shaper cutting apparatus as defined in claim 25, wherein said gear shaping tool has a total film thickness of 0.5 to 10 μm, including a five- or ten-layer coating with a 0.05 μm thick TiN film sandwiched between films having the composition comprising $(Ti_{0.5}Al_{0.5})N$.

29. A gear shaper cutting apparatus as defined in claim 22, further comprising: means for blowing air against a cutting portion.

* * * * *